US011755582B2

(12) United States Patent
Jagota et al.

(10) Patent No.: US 11,755,582 B2
(45) Date of Patent: Sep. 12, 2023

(54) ADAPTIVE FIELD-LEVEL MATCHING

(71) Applicant: salesforce.com, inc., San Francisco, CA (US)

(72) Inventors: Arun Kumar Jagota, Sunnyvale, CA (US); Ajitesh Jain, San Mateo, CA (US); Rahul Mathias Madan, Sunnyvale, CA (US); Shravani Madhavaram, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 585 days.

(21) Appl. No.: 16/862,667

(22) Filed: Apr. 30, 2020

(65) Prior Publication Data

US 2021/0342353 A1 Nov. 4, 2021

(51) Int. Cl.
*G06F 7/00* (2006.01)
*G06F 16/2455* (2019.01)
*G06N 20/00* (2019.01)

(52) U.S. Cl.
CPC .. *G06F 16/24558* (2019.01); *G06F 16/24564* (2019.01); *G06N 20/00* (2019.01)

(58) Field of Classification Search
CPC ........ G06F 16/24558; G06F 16/24564; G06F 16/24522; G06F 16/9574; G06F 16/535; G06F 16/7867; G06F 16/958; G06F 16/738; G06F 3/0482; G06F 3/0481; G06F 18/22; G06F 18/214; G06N 20/00
See application file for complete search history.

(56) References Cited

U.S. PATENT DOCUMENTS

| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Fim et al. |
| 5,918,159 A | 6/1999 | Fomukong et al. |
| 5,963,953 A | 10/1999 | Dram et al. |

(Continued)

*Primary Examiner* — Mohammad A Sana
(74) *Attorney, Agent, or Firm* — Dergosits & Noah LLP; Todd A. Noah

(57) ABSTRACT

Adaptive field-level matching is described. A system identifies first elements in a field of a prospective record for a database, and second elements in the field of a candidate record, in the database, for matching the prospective record. The system identifies features corresponding to any of the first elements that are identical to any of the second elements, any of the first elements that are absent from the second elements, and any of the second elements that are absent from the first elements. A machine-learning model uses the features to determine a field match score for the candidate record's field. Another machine-learning model weighs the field match score and weighs another field match score for another field of the candidate record to determine a record match score for the candidate record. If the record match score satisfies a threshold, the system identifies the candidate record as matching the prospective record.

20 Claims, 4 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2018/0165354 A1* | 6/2018 | Jagota ............... G06F 16/31 |
| 2021/0279604 A1* | 9/2021 | Seth .................. G06N 5/04 |

* cited by examiner

ADAPTIVE FIELD-LEVEL MATCHING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database can store digital objects as records for each person or organization that might be able to help in achieving a goal. Each record can consist of a few standard fields, such as fields that store a first name, a last name, an organization name, a job title, a street address, a phone number, a mobile phone number, a fax number, an e-mail address, and a website address. A data platform can enable data providers, such as data marketplace vendors and crowd-sourced database system users, to provide their datasets to organizations. After an organization acquires a dataset from the platform, the organization's database system can match the dataset's records to the appropriate type(s) of the organization's existing records, and use suitable fields of data from the dataset's records to update or add to the existing database records that match the dataset's records, thereby enriching the existing database records.

A database system's process that determines whether a dataset's records sufficiently match existing database records may be an intensive process that matches multiple values between these corresponding records, thereby consuming a significant amount of system resources. Consequently, a database system can initially identify any existing database records that match only a limited number of corresponding values stored by a dataset record, using a shallow matching process that consumes a relatively limited amount of system resources. Then the database system can use the intensive multiple-value deep matching process to determine whether the dataset record sufficiently matches any of the relatively small number of shallow matching records which were identified from the large number of existing database records. The dataset record may be referred to as a prospective record for a database because of the prospects for the record's data to be added to the database. The shallow matching records may be referred to as candidate records because these records have been identified as the best candidates for matching a prospective record. Due to the shallow matching process, candidate records typically contain both relevant matching records and false positive matching records for a prospective record. Therefore, the database system uses a deep matching engine to evaluate the candidate records and eliminate all of the candidate records that do not sufficiently match the prospective record.

Prior to using the deep matching engine, the database system can normalize, standardize, and clean the prospective record field values and the candidate record field values to enable the deep matching engine to use fuzzy matching to sufficiently match the prospective record with the candidate records. Normalization can transform record fields' values to a normal form so that the deep matching engine can generate a high field match score for identical field values and a low field match score for differing field values. For some record fields, such as street address, phone number, and internet domain, normalization can split a record field's value into multiple components, which can assist the deep matching engine to assign more weight to important record field value components. For example, the database system splits a zip code field's value 94402-001 into a zip code base 94402 and a zip code add-on 001, and assigns more importance to the zip code base than to the zip code add-on because many records may not store any value for the zip code add-on. The database system can also use a normalizer to detect and strip away international codes, and non-digit characters from phone numbers.

The database system can also standardize individual record field values prior to executing the deep matching engine. For example, since record fields for street addresses may include different street suffix abbreviations, such as st. for street and hwy for highway, as well as expanded forms of street address values, such as street for st. and avenue for ave., a database system may replace all differing street suffix abbreviations and expansions with the same standard street suffix value, such as st. The database system can additionally clean individual record field values by converting uppercase characters to lowercase characters, stripping away special characters such as punctuation, clustering any consecutive single characters, and stripping away any common/stop words, which tend to be the rightmost words in an organization name, such as Inc., Corp., and LLC. For example, an organization name record field stores the value M. C. Southwest, Inc., which a database system cleans to become mc southwest. Normalizing, standardizing, and cleaning record field values helps the deep matching engine to avoid mismatches of record fields that should be matched.

The deep matching engine can use a match rule that identifies a combination of different record fields that are used to match a prospective record with candidate records. For example, a match rule can specify comparing the values in the organization name field and the address field of a prospective record against the values in the organization name field and the address field of a candidate record. Continuing the example, the deep matching engine can use the edit distance with a pre-determined and certain threshold such as 90 to compare record fields' organization name values and compare components of the record fields' address values, such as street name, street number and zip code. The table below depicts examples of organization name field values and whether the deep matching engine should match the organization name field values.

| organization name 1 | organization name 2 | desired result |
| --- | --- | --- |
| Hewlett-Packard | Hewlett Packard | match |
| Univ. of Okla | University of Oklahoma | match |
| Kia | Kia Motors America | match |
| G and J Truck Sales, Inc | G & J Truck Sales | match |
| US Department of Energy | US Department of Labor | no match |

A system administrator configures matching rules for specific record fields, configures different algorithms for matching specific record field values, configures suitable thresholds for matching specific record field values, and can configure different rules for different data providers' datasets. A database system can assign a dedicated weight to the field match score for each comparison of a field value in a candidate record against the corresponding field value in a prospective record, combine the weighted scores to generate the record match score for each candidate record, rank the candidate records by their record match scores, and determine whether any of the highest ranked candidate records have record match scores that are greater than a record matching threshold. A system administrator can also configure weights for each record field for each data provider.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1:
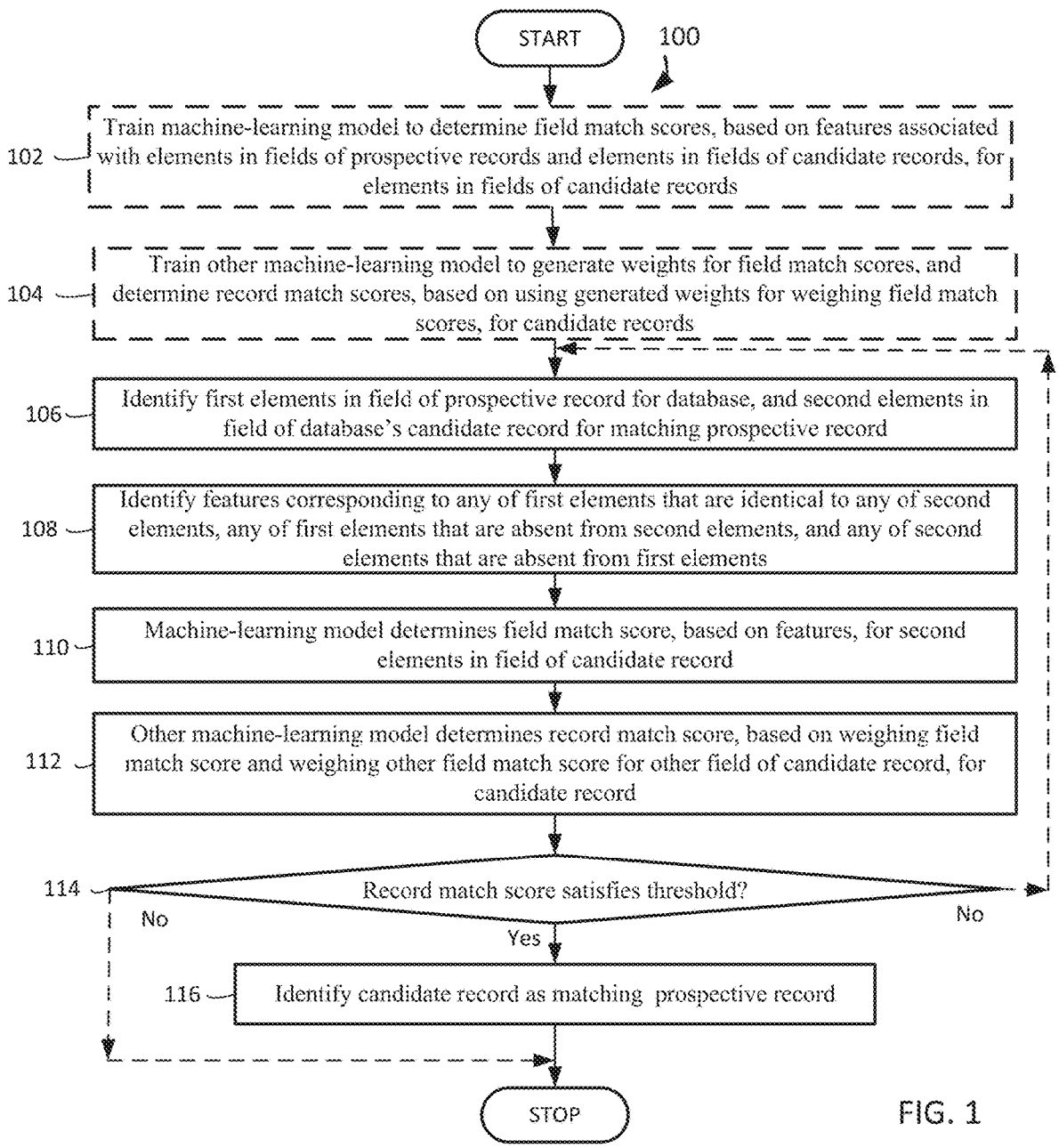
FIG. 1 is an operational flow diagram illustrating a high-level overview of a method for adaptive field-level matching, in an embodiment.

In accordance with embodiments described herein, there are provided systems and methods for adaptive field-level matching. A system identifies first elements in a specific field of a prospective record for a database, and second elements in the same field of a candidate record, in the database, for matching the prospective record. The system identifies features corresponding to any of the first elements that are identical to any of the second elements, any of the first elements that are absent from the second elements, and any of the second elements that are absent from the first elements. A machine-learning model uses the features to determine a field match score for the candidate record's field. Another machine-learning model weighs the field match score and weighs another field match score for another field of the candidate record to determine a record match score for the candidate record. If the record match score satisfies a threshold, the system identifies the candidate record as matching the prospective record.

For example, a database system maintains a database, acquires a dataset that stores "ed jones salesforce corporation 415-901-7000" in a prospective record's fields, and executes a shallow matching engine that identifies multiple candidate records for matching the prospective record. The database system identifies "ed", "jones", "salesforce corporation", and "415-901-7000" in the first name, last name, organization name, and phone number fields of the prospective record, and identifies "Dr. Edward", "Jones", and "Salesforce.com, Inc." in the first, last, and organization name fields of one of the candidate records. The database system identifies features that include two consecutive characters "ed" in the prospective record's first name field and the candidate record's first name field, an unmatched prefix "Dr." in the candidate record's first name field, and an unmatched suffix "ward" in the candidate record's first name field.

A trained machine-learning model uses the first name field features to calculate a first name field match score of 90 for the candidate record's first name field value, and other features to calculate a last name field match score of 95 for the candidate record's last name field value, and an organization name field match score of 85 for the candidate record's organization name field value. Another trained machine-learning model multiplies the first name field match score of 90 by the first name field weight of 0.5, multiplies the last name field match score of 95 by the last name field weight of 0.6, and multiplies the organization name field match score of 85 by the organization name field weight of 0.8, and aggregates the three products of 45.0, 57.0, and 68.0 to calculate a record match score of 170.0 for the candidate record. Since the record match score of 170.0 is greater than the first-last-organization-name threshold of 150.0, the database system identifies the candidate record as matching the prospective record, and updates the database system's existing profile record for Salesforce's Dr. Edward Jones with the prospective record's phone number for ed jones, which the database system previously lacked.

Systems and methods are provided for adaptive field-level matching. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for adaptive field-level matching will be described with reference to example embodiments. The following detailed description will first describe a method for adaptive field-level matching.

While one or more implementations and techniques are described with reference to an embodiment in which adaptive field-level matching are implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to, or that are not mentioned or alluded to at all, in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

A database system can train and execute a machine-learning classifier for adaptive record field-level matching. Since the process of matching record fields' values is complex, with many nuances, a machine-learning approach provides better incremental enhancements than human-designed algorithms provide and is therefore more accurate than human-designed algorithms. Furthermore, the structure of the machine-learning classifier's software is simpler because record field-specific customizations are isolated into the feature extractions of a quasi-generic machine-learning classifier, which is unlike record field-level matching algorithms that use different logic for matching each different type of record field. The machine-learning classifier's engineering manual can provide an easily understood list of record field-specific features, which enables the convenient testing of record field-specific matchers, which is typically unavailable for record field-level matching algorithms that use different logic for matching each different type of record field. A machine-learning classifier can learn the features required for calculating field match scores from a relatively small training set of data scenarios. A machine-learning classifier can also shorten the cycle from identifying quality issues (such as specific false positive or false negative scenarios) to correcting the underlying causes. Since a machine-learning classifier for individual record fields can train on training data to determine whether or not two record fields' values match, a system administrator is no longer needed to configure different algorithms, such as edit distance, which are typically required for matching record field values.

A database system trains a machine-learning model to use the features of the different types of fields of both the prospective records for a database and the database's candidate records for matching the prospective records, in order to calculate the candidate records' field match scores. A machine-learning model can be a computer system that scientifically studies algorithms and/or statistical models to perform a specific task effectively by relying on patterns and inference instead of using explicit instructions. A feature can be a distinctive attribute or characteristic of something. A field can be a specific part of a record, representing an item of data. A prospective record can be at least one stored value that could potentially be used to update a database or dataset. A database can be a structured set of information held in a computer. A candidate record can be at least one database or dataset value that could potentially correspond to another database or dataset value. A field match score can be a measure of correspondence between the same parts of different records.

The database system prepares for the training process by identifying the elements in a field of both a prospective record and a candidate record. An element can be a component of a string or a value. The database system can tokenize strings or values in the zip/postal code fields, the phone number fields, the personal first name fields, and the personal last name fields at the level of individual characters. A postal code field can be a part of a record which stores symbols relating to mail. A phone number field can be a part of a record which stores symbols related to communicating via a telecommunication device. A personal first name field can be the primary identifier given to an individual by their family or parents. A personal last name field can be the secondary or family identifier given to an individual by their family or parents. A character can be a symbol.

In an example of zip code elements, a database system identifies the string P in a Prospective record's zip code field and the string C in a Candidate record's zip code field and might strip any zip code add-on from either string. Similarly, in an example of phone number elements, the database system identifies the string P in a Prospective record's phone number field and the string C in a Candidate record's phone number field, and might strip any leading area code and/or non-numerical symbols from either string. Likewise, in an example of personal first name elements, the database system identifies the string P in a Prospective record's first name field and the string C in a Candidate record's first name field, and might convert uppercase characters to lowercase characters in either string, and/or strip any punctuation symbols and/or prefixes (such as Miss/Mrs.) from either string. Also, in an example of personal last name elements, the database system identifies the string P in a Prospective record's last name field and the string C in a Candidate record's last name field, and might convert uppercase characters to lowercase characters in either string, and/or strip any punctuation symbols from either string.

After identifying records' elements, a database system identifies the features for any of the prospective record's elements that are identical to any of the candidate record's elements, any of the prospective record's elements that are absent from the candidate record's elements, and any of the candidate record's elements that are absent from the prospective record's elements. In a general example of identifying zip code features, a database system compares each digit in the prospective and candidate records' zip code fields from left-to-right, such that the feature $F_i$, =M (matched) if $P_i=C_i$, the feature $F_i=N$ (non-match) if $P_i \neq C_i$, and the feature $F_i=U$ (unmatched) if $P_i$ is missing and $C_i$ is present or if $P_i$ is present and C, is missing. Zip/postal code field values are examples of values with a prefix structure. Prefixes of zip/postal codes correspond to broader geographic areas, at least for USA zip codes and Canadian postal codes. For zip/postal codes of matching records (such as contacts or accounts) the tail is more likely to differ than the head. This may be because people and companies tend to move to nearby locations. A prefix can be something added to the beginning of something else.

Similarly, in a general example of identifying phone number features, a database system compares each digit in the prospective record's phone number fields and candidate record's phone number fields from right-to-left, such that the feature $F_i$, =M (matched) if $P_i=C_i$, the feature $F_i=N$ (non-match) if $P_i \neq C_i$, and the feature $F_i=U$ (unmatched) if $P_i$ is missing and $C_i$ is present or if $P_i$ is present and C, is missing. Phone number field values are examples of values with a prefix structure. Prefixes of phone numbers generally correspond to broader instances, in geographic area or population. For phone numbers of matching records (such as contacts or accounts) the tail is more likely to differ than the head. This can be because a person may tend to get assigned a new phone number with the same three-digit area code and the same three-digit central office code, but with different four-digit station numbers.

A machine-learning model uses the identified features to calculate a field match score for a field of a candidate record, and then compares the calculated field match score to the training data's label in order to learn incremental enhancements for calculating field match scores in the future. In a numerical example based on zip code features, if P=95123 and C=95328, then F=MMNNN.

| P | 9 | 5 | 1 | 2 | 3 |
|---|---|---|---|---|---|
| C | 9 | 5 | 3 | 2 | 8 |
| F | M | M | N | N | N |

This numerical example depicts the feature of consecutive characters of the candidate record's characters (95) which correspond to and are identical to consecutive characters of the prospective record's characters (95). This numerical example also depicts the feature of a suffix that includes at least one of the candidate record's characters (328) that corresponds to and differs from at least one of the prospective record's characters (123). Consecutive characters can be symbols that follow each other continuously. A suffix can be something added to the end of something else. Continuing the example, the machine-learning model uses the features of 2 consecutive identical characters and a suffix of 3 differing characters for the prospective and candidate records' zip codes to calculate a low field match score of 40 for the candidate record's zip code field. Then the machine-learning model compares the low field match score of 40 to the training data's label which specifies no match, and learns incremental enhancements for calculating an even lower field match score of 35 for any subsequent records' zip codes that have features that are similar to 2 consecutive identical characters and a suffix of 3 differing characters.

In another numerical example based on zip code features, if P=95123 and C=85123, then F=NMMMM.

| P | 9 | 5 | 1 | 2 | 3 |
|---|---|---|---|---|---|
| C | 8 | 5 | 1 | 2 | 3 |
| F | N | M | M | M | M |

This numerical example depicts the feature of a prefix that includes at least one of the candidate record's characters (8) that corresponds to and differs from at least one of the prospective record's characters (9). This numerical example also depicts the feature of consecutive characters of the candidate record's characters (5123) which correspond to and are identical to consecutive characters of the prospective record's characters (5123). Continuing the example, the machine-learning model uses the features of a prefix of 1 different character and 4 consecutive identical characters for the prospective and candidate records' zip codes to calculate a high field match score of 80 for the candidate record's zip code field. Then the machine-learning model compares the high field match score of 80 to the training data's label which specifies no match and learns that a zip code mismatch on the first digit is more important than a zip code matching on the last 4 digits. This learning results in the machine-learning model calculating a lower field match score of 75 for any subsequent records' zip codes that have the features that are similar to a prefix of 1 different character and 4 consecutive identical characters.

In yet another numerical example based on zip code features, if P=95123 and C=95123-1459, then F=MMMMMUUUU.

| P | 9 | 5 | 1 | 2 | 3 |   |   |   |   |
|---|---|---|---|---|---|---|---|---|---|
| C | 9 | 5 | 1 | 2 | 3 | 1 | 4 | 5 | 9 |
| F | M | M | M | M | M | U | U | U | U |

This numerical example depicts an example of the feature of a suffix that includes at least one of the candidate record's characters (1459) that lacks correspondence to any of the prospective record's characters. This numerical example also depicts the feature of consecutive characters of the candidate record's characters (95123) which correspond to and are identical to consecutive characters of the prospective record's characters (95123). Continuing the example, the machine-learning model uses the features of 5 consecutive identical characters and a suffix of 4 unmatched characters for the prospective and candidate records' zip codes to calculate a high field match score of 90 for the candidate record's zip code field. Then the machine-learning model compares the high field match score of 90 to the training data's label which specifies a match and learns that a zip code matching on the first five digits is more important than a zip code with an unmatched suffix of the last 4 digits. This learning results in the machine-learning model calculating a higher field match score of 95 for any subsequent records' zip codes that have features that are similar to a prefix of 5 matching characters followed by an unmatched suffix of 4 consecutive characters.

In a numerical example based on phone number features, if P=4567890 and C=556 7899, then F=NMMMMMN.

| P | 4 | 5 | 6 | 7 | 8 | 9 | 0 |
|---|---|---|---|---|---|---|---|
| C | 5 | 5 | 6 | 7 | 8 | 9 | 9 |
| F | M | M | M | M | M | M | M |

This numerical example depicts the features of a prefix that includes at least one of the candidate record's characters (5) that corresponds to and differs from at least one of the prospective record's characters (4), and a suffix that includes at least one of the candidate record's characters (9) that corresponds to and differs from at least one of the prospective record's characters (0). This numerical example additionally depicts the feature of consecutive characters of the candidate record's characters (56789) which correspond to and are identical to consecutive characters of the prospective record's characters (56789). Continuing the example, the machine-learning model uses the features of a prefix of 1 different character, 5 consecutive identical characters, and a suffix of 1 different character for the prospective and candidate records' phone numbers to calculate a high field match score of 70 for the candidate record's phone number field. Then the machine-learning model compares the high field match score of 70 to the training data's label which specifies no match and learns that a phone number's mismatches on the first and last digits are more important than a phone number's match on the intervening 5 digits. This learning results in the machine-learning model calculating a lower field match score of 65 for any subsequent records' phone numbers that have features that are similar to a prefix of 1 different character, 5 consecutive identical characters, and a suffix of 1 different character.

In another numerical example based on phone number features, if P=1234567890 and C=4567890, then F=UUUMMMMMMM.

| P | 1 | 2 | 3 | 4 | 5 | 6 | 7 | 8 | 9 | 0 |
|---|---|---|---|---|---|---|---|---|---|---|
| C |   |   |   | 4 | 5 | 6 | 7 | 8 | 9 | 0 |
| F | U | U | U | M | M | M | M | M | M | M |

This numerical example depicts an example of the feature of a prefix that includes at least one of the prospective record's characters (123) that lacks correspondence to any of the candidate record's characters. This numerical example also depicts the feature of consecutive characters of the candidate record's characters (4567890) which correspond to and are identical to consecutive characters (4567890) of the prospective record's characters. Continuing the example, the machine-learning model uses the features of a prefix of 3 unmatched characters and 7 consecutive identical characters for the prospective and candidate records' phone numbers to calculate a high field match score of 70 for the candidate record's phone number field. Then the machine-learning model compares the high field match score of 70 to the training data's label which specifies a match and learns that a phone number's matches on the last 7 digits are more important than a phone number's lack of a prefix of 3 digits. This learning results in the machine-learning model calculating a higher field match score of 75 for any subsequent records' phone numbers that have features that are similar to a prefix of 3 unmatched characters and 7 consecutive identical characters.

The database system can use an algorithm such as the following to determine features in a person's first name record field, where p represents the Prospective record field's first name string, and c represents the Candidate record field's first name string.

```
def prefix_match_suffix(p,c)
# puts "#{p}\t#{c}"
lcs,i,j = p.lcs(c)
# puts "#{i}\t#{j}\t#{lcs}"
fpc  = [lcs.length.to_s].to_set # Just treat match length as a 1-char string.
fp   = [p[0...i] + "_p",p[(i+lcs.length)..-1] + "_s"].to_set
fp  += [i.to_s + "_pl",(p.length - (i+lcs.length)).to_s + "_sl"].to_set # Lengths of unmatched prefix and suffix of p as features
fc   = [c[0...j] + "_p",c[(j + lcs.length)..-1] + "_s"].to_set
fc  += [j.to_s + "_pl",(c.length - (j+lcs.length)).to_s + "_sl"].to_set # Lengths of unmatched prefix and suffix of c as features
return [fpc,fp,fc]
end
```

The following table depicts examples of prospective and candidate records' first name field values.

| Prospective record | Candidate record | training label | pattern |
|---|---|---|---|
| John | john | match | exact match |
| ed | Edward | match | prefix match |
| dr jeff | jeff | match | dr salutation |
| george | josh | no match | total mismatch |

The example prospective and candidate records' first name field values depict the feature of consecutive characters of the prospective record's characters (John) which correspond to and are identical to consecutive characters of the candidate record's characters (john). The above values also depict the feature of consecutive characters of the candidate record's characters (Ed) which correspond to and are identical to consecutive characters of the prospective record's characters (ed), combined with the feature of a suffix that includes at least one of the candidate record's characters (ward) that lacks correspondence to any of the prospective record's characters. The above values additionally depict the feature of consecutive characters of the prospective record's characters (Jeff) which correspond to and are identical to consecutive characters of the candidate record's characters (Jeff), combined with the feature of a prefix that includes at least one of the prospective record's characters (dr) that lacks correspondence to any of the candidate record's characters. The above values further depict the feature of a prefix that includes at least one of the prospective record's characters (geo) that corresponds to and differs from at least one of the candidate record's characters (Jo), combined with the feature of a suffix that includes at least one of the prospective record's characters (rge) that corresponds and differs from at least one of the candidate record's characters (sh).

The database system can use the algorithm above in more limited situations to determine features in a person's last name record field, where p represents the Prospective record field's last name string, and c represents the Candidate record field's last name string. The following table depicts examples of prospective and candidate records' last name field values.

| Prospective record | Candidate record | training label | pattern |
|---|---|---|---|
| Smith | smith | match | exact match |
| Smithson | Smith | no match | prefix match |
| Jones | Jones MD | match | dr honorific |
| Smith | Jones | no match | total mismatch |

The example prospective and candidate records' last name field values depict the feature of consecutive characters of the prospective record's characters (Smith) which correspond to and are identical to consecutive characters of the candidate record's characters (smith). The above values also depict the feature of consecutive characters of the candidate record's characters (Smith) which correspond to and are identical to consecutive characters of the prospective record's characters (Smith), combined with the feature of a suffix that includes at least one of the candidate record's characters (son) that lacks correspondence to any of the prospective record's characters. The above values additionally depict the feature of consecutive characters of the prospective record's characters (Jones) which correspond to and are identical to consecutive characters of the candidate record's characters (Jones), combined with the feature of a suffix that includes at least one of the prospective record's characters (MD) that lacks correspondence to any of the candidate record's characters. The above values further depict the feature of a prefix that includes at least one of the prospective record's characters (Smi) that corresponds to and differs from at least one of the candidate record's characters (Jo), combined with the feature of a suffix that includes at least one of the prospective record's characters (th) that corresponds and differs from at least one of the candidate record's characters (nes).

The database system can tokenize strings or values in the organization name fields, which may be referred to as the company name fields, at the level of individual words or syllables. An organization name field can be a part of a record that stores an identifier of an enterprise. A word can be a single distinct meaningful element of writing. The features for p. the Prospective record's organization name field value, and c, the Candidate records organization name field value, can be defined as:

$Fpc$=words_in($p$) & words_in($c$)

$Fp$=words_in($p$)-words_in($c$)

$Fc$=words_in($c$)-words_in($p$)

Two additional features are derived from Fpc, Fp, and Fc:

$X\_pc=P$(words in $Fpc$)=~product_$\{w$ in $Fpc\}P(w)$ $X\_u=P(Fp+Fc)$=~product_$\{w$ in $Fp+Fc\}P(w)$ where P(w) is the fraction of organization names in a rich corpus of organization names in which the word w appears.

Organization names are examples of fields with a prefix structure because the least informative words, which may be referred to as stop words, tend to be the rightmost words in an organization name, such as Inc., Corp., and LLC., while the most informative words tend to be at the beginning of the organization name. For example, in the organization name Cisco Systems, Cisco is more informative than Systems. In the organization name field, stop words that are in the suffixes, such as Inc., Corp., and LLC., are more likely to be left off than the first word in the organization name.

One derived feature for the prospective and candidate records' organization name fields is the feature of matched words, which include each of the prospective record's organization name words that are identical to any of the candidate record's organization name words, and a probability that each of the matched words is in a large list of organization names. Another derived feature for the prospective and candidate records' organization name fields is the feature of unmatched words, which include each of the prospective record's organization name words that are absent from the candidate record's organization words and each of the candidate record's organization words that are absent from the prospective record's organization name words, and a probability that each of the unmatched words is in the large list of organization names.

In an example based on organization name features, if P=Salesforce INC. and C=Salesforce Corporation, then F=MU.

| P | Salesforce | INC. |
|---|---|---|
| C | Salesforce | Corporation |
| F | M | U |

This example depicts the feature of a matched word, "Salesforce", and the feature of unmatched words, "INC." and "Corporation." Continuing the example, the machine-learning model uses the features of the matched word combined with its probability of being in the organization name list and the unmatched words combined with their probabilities of being in the organization name list to calculate a high field match score of 80 for the candidate record's organization name field. Then the machine-learning model compares the high field match score of 80 to the training data's label which specifies a match, and learns that an organization name only mismatching on the last word is unimportant when the mismatched words are the frequently occurring "INC." and "Corporation," and the matched word is the relatively infrequently occurring "Salesforce." The machine-learning model learns that "Salesforce" is relatively distinguishing word, while "INC." and "Corporation" are not relatively distinguishing words. This results in the machine-learning model learning incremental enhancements for calculating an even higher field match score of 85 for any subsequent records' organization names that mismatch on only the last word when the words appear as frequently as "INC." and "Corporation" and the matched word occurs as relatively infrequently as "Salesforce."

In another example based on organization name features, if P=US Department of Energy and C=US Department of Labor, then Fpc=US Department of, Fp=Energy, and Fc=Labor.

| P | US | Department | of | Energy |
|---|---|---|---|---|
| C | US | Department | of | Labor |
| F | Fpc | Fpc | Fpc | Fp/Fc |

This example depicts the feature of matched words, "US," "Department," and "of," and the feature of unmatched words, "Energy" and "Labor." Continuing the example, the machine-learning model uses the features of the matched words combined with their probabilities of being in the organization name list and the unmatched words combined with their probabilities of being in the organization name list to calculate a high field match score of 75 for the candidate record's organization name field. Then the machine-learning model compares the high field match score of 75 to the training data's label which specifies no match, and learns that an organization name only mismatching on the last word is important when the mismatched words are the infrequently occurring "Energy" and "Labor," and the matched words are the frequently co-occurring "US Department of." The machine-learning model learns that the distinguishing words in the organization name fields is the last mismatched word, and not the many matched words. This learning results in the machine-learning model calculating a lower field match score of 70 for any subsequent records' organization names that mismatch on only the last word when the words appear as infrequently as "Labor" and "Energy," and the matched words are frequently co-occurring as "US Department of."

The desired match behavior may be specified as a "qualitative" AND:

Match=($X\_pc$ is sufficiently low) AND ($X\_u$ sufficiently large)

This equation specifies that the matched parts must be significant, and that the unmatched parts must be insignificant, which models the interaction of these two features. The natural formalization of this involves a product-of-experts model on two features $lx_{pc}$=log $X_{pc}$ and $lx_u$=log $X_u$. The model is $\sigma_{pc}(lx_{pc})*\sigma_u(lx_u)$. Here $\sigma_{pc}(lx_{pc})$ transforms the value of the feature $lx_{pc}$ to a probability through the parametrized sigmoid $\sigma_{pc}$. Similarly, $\sigma_u(lx_u)$ transforms the value of the feature $lx_u$ to a probability through the parametrized sigmoid $\sigma_u$. Thus, each expert is univariate and outputs a probability.

The product of the probabilities given by the experts constitutes the product-of-experts score. The parameters of the experts (sigmoids) are estimated from univariate training sets. A univariate training set is derived from a multi-variate training set by replacing the multi-variate predictors by a suitable univariate predictor, in this case just by projecting the univariate predictor from the multi-variate space. The univariate training sets constructed for estimating the parameters of their corresponding experts (in this case sigmoids)

are specially designed to train those particular experts. As an example, consider the training set for training the parameters of $\sigma_{pc}$.

The aim is to find a soft version of a linear discriminant function, such as a value c of $lx_{pc}$ for which $lx_{pc} \leq c$ should get a probability tending towards 1, and $lx_{pc} \geq c$ should get a probability tending towards 0. The goal is to find the $\sigma_{pc}$ that best fits the empirical conditional distribution of the labels $P(y|lx_{pc})$ in the given training set. In the sample training set below, the organization name pairs intentionally do not have any unmatched portions which can only contribute noise to the univariate fitting problem. A sample training set for $\sigma_{pc}$:

| Prospective record | Candidate record | Label |
|---|---|---|
| corp | Corp | no match |
| bank of america | bank of america | match |
| google | google | match |
| group | group | no match |

Similarly, the training set for $\sigma_u$ focuses on unmatched parts that influence the label. In all the training instances, the $lx_{pc}$ values need to be sufficiently negative, such that the matched part should be significant. A table of a sample training set for $\sigma_u$:

| Prospective record | Candidate record | Label |
|---|---|---|
| intel | intel corp | match |
| national institute of health | national institute of physics | no match |
| cisco | cisco systems | match |
| ge health | ge insurance | no match |

Estimating the gain and the offset of the best-fitting sigmoid from a data set of (x, y) pairs, where $x \in R$ and $y \in \{0,1\}$, is formally described. Let $m_y$ denote the mean x-value over the samples labeled y in the training set. Then the sigmoid's offset is set to the average of $m_0$ and $m_1$. The gain of the sigmoid is set to $g=2 (m_1-m_0)$. Once the parameters of the individual experts (sigmoids) have been learned from their univariate training sets, an overall threshold is trained to maximize the recall for a given minimum precision threshold P. This training is done over a "natural" multi-variate training set.

Many matching scenarios are locale-specific. Locale might be by country or by language, with the following desiderata. A single labeled data set is preserved, with one addition: a segmenting field. The data set preparer is responsible for naming and populating this field. Sensible examples include segment=ISO two-letter country code, and segment=ISO language code. The labeled data set is maintained and updated, so that the machine-learning model learns locale-specific scenarios and locale-agnostic scenarios from the labeled data set.

The database system can tokenize strings or values in the city name fields at the level of individual words. A city name field can be a part of a record that stores an identifier of a large settlement of humans. The features for p. the Prospective record's city name field value, and c, the Candidate record's city name field value, can be defined as:

$Fpc$=words_in($p$) & words in($c$)

$Fp$=words_in($p$)-words_in($c$)

$Fc$=words_in($c$)-words_in($p$)

In an example based on city name features, if P="East Palo Alto" and C="E. Palo Alto," then Fpc="acronym marker", "Palo", "Alto", "Palo Alto", and "3_1"; Fp="East", "East Palo", and "2_1"; and Fc="E", "EPalo", and "2_1". Continuing the example, the trained machine-learning model uses the feature of the unmatched prefix to identify "East" as an expansion of the acronym "E."

In another example based on city name features, if P="SF" and C="San Francisco", then Fpc="acronym marker"; Fp="SF" and "1_1"; and Fc="San", "Francisco", "San Francisco", and "3_1". Continuing the example, the trained machine-learning model uses the feature of the unmatched words to identify "SF" as an acronym for "San Francisco."

FIG. 1 is an operational flow diagram illustrating a high-level overview of a method 100 for adaptive field-level matching. A machine-learning model is optionally trained to use features of elements in fields of prospective records and elements in fields of candidate records to calculate field match scores for the candidate records' fields, block 102. A machine-learning model can train to score the matching between fields' values in prospective and candidate records. For example, and without limitation, this can include a machine-learning classifier training to use the features of the values stored by different types of fields of both the prospective records for a database and the database's candidate records for matching the prospective records, in order to calculate the candidate records' field match scores.

In addition to training a machine-learning model to generate field match scores for the prospective and candidate record fields' elements, the database system trains an adaptive ranking machine-learning model to use a supervised algorithm to automatically generate adaptive weights for each of the different field match scores. The adaptive ranking machine-learning model may be the same as or different from the machine-learning model that generates the field match scores. A weight can be the ability of something to influence a decision or an action. The input to train the adaptive ranking machine-learning model is a triples file which consists of an input record, a first matched record and a second matched record, where the first matched record ranks higher for matching the input record than the second matched record ranks for matching the input record. The following field match score table depicts an input record, a first matched record, and a second matched record that have example field values, and the first matched record and the second matched record that have example field match scores:

| record | organization name (score) | address (score) | city name (score) | zip code (score) | # employees (score) |
|---|---|---|---|---|---|
| input | Salesforce | 1 Market Street Suite 300 | | 94105 | |
| first | Salesforce Foundation (60) | 1 Market Street Suite 300 (100) | San francisco (0) | 94104 (90) | 100 (0) |
| second | Salesforce.com, Inc. (80) | 1 Market Street (90) | San Francisco (0) | 94104 (90) | 10,000 (0) |

The adaptive ranking machine-learning model generates and uses two different types of weights, field match score weights and intrinsic score weights. A field match score weight is a weight that is generated for a score that depends on the similarity of a prospective record field's value and a candidate record field's value. For example, the adaptive ranking machine-learning model generates a weight of 0.4 for the organization name field match score, a weight of 0.6 for the address field match score, a weight of 0.1 for the city name field match score, and a weight of 0.2 for the zip code field match score. An intrinsic score weight is a weight that is generated for a score that depends on the similarity of an inherent property in a prospective record's field and a candidate record's field. For example, the adaptive ranking machine-learning model generates a weight of 10,000 for the "is HQ" (is headquarters) field match score and a weight of 0.01 for the number of employees record field match score. The following weight table depicts example weights:

| organization name score weight | address score weight | city name score weight | zip code score weight | is HQ score weight | # employees score weight | ratio (A) |
|---|---|---|---|---|---|---|
| 0.4 | 0.6 | 0.1 | 0.2 | 10,000 | 0.001 | 0.8 |

Consequently, the record match score for a candidate record is based on each of the field match scores and intrinsic scores (S) for a Candidate (C) record, and can be expressed as record match score$(S,C)$=$A$*field_match_score_weight$(S,C)$+$(1-A)$*normalized_intrinsic_score_weight$(S,C)$ where A is the importance given to the field match score relative to the intrinsic score.

Additional to the training to score matches between records field elements, another machine-learning model is optionally trained to generate weights for field match scores, and then use the weights for weighing the field match scores to determine record match scores for candidate records, block 104. A machine-learning model can train to generate the weights of field match scores used to calculate record match scores for candidate records. By way of example and without limitation, this can include an adaptive ranking machine-learning model generating the weights in the weight table above, multiplying the three non-zero field match scores listed in the field match score table above for each of the first record and the second record by their corresponding weights and the ratio in the weight table above to produce the following record scores.

Record 1's record match score=0.8(ratio)*[60(1$^{st}$ organization name score)*0.4(organization name weight)+100(1$^{st}$ address score)*0.6(address weight)+90(1$^{st}$ zip code score)*0.2(zip code weight)]=0.8*[60*0.4+100*0.6+90*0.2]=0.8* [24+60+18]=0.8*102=81.6.

Record 2's record match score=0.8(ratio)*[80(2$^{nd}$ organization name score)*0.4(organization name weight)+90(2$^{nd}$ address score)*0.6(address weight)+90(2$^{nd}$ zip code score)*0.2(zip code weight)]=0.8*[80*0.4+90*0.6+90*0.2]=0.8* [32+54+18]=0.8*104=83.2.

The weights for individual record field scores are defined in metadata. The metadata defines for each data vendor, which record field scores will be required for the calculation of the record match score and what is the weight for each required record field score. For example:

```
<rankDefinition>
    <rankfields>
        <rankfield>
            <name>netIncome</name>
            <weight>0.2</weight>
        </rankfield>
    </rankfields>
    <pbMatchFields>
        <pbMatchField>
            <name> organization Name</name>
            <weight>0.3</weight>
        </pbMatchField>
```

-continued

```
    </pbMatchFields>
    <scoreRatio>0.5</scoreRatio>
</rankDefinition>
```

The adaptive ranking machine-learning model optimizes an error function and the minima of the error function provides the corresponding weights. The adaptive ranking machine-learning model depends on the model of the data to be fit. For example, given a set of points (x, y), the model fits a line y=$\theta_1$x. The loss function for the adaptive ranking machine-learning model is defined to penalize the difference between what is the expected output and the actual output. For example, J=(Expected–Actual)$^2$=$\Sigma[\theta_1 x_i - y_i]^2$. The loss function is optimized to identify the parameters that take the difference between the expected output and the actual output to a minima. The most common method is gradient descent, which follows the gradient of loss function at a given point, and eventually reaches a minima.

Figure 2C:
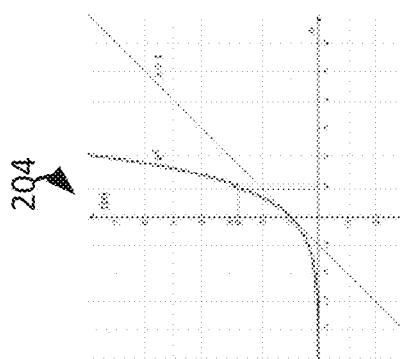
FIGS. 2A-D illustrate example graphs and an overview of a machine-learning classifier for adaptive field-level matching, in an embodiment.
Figure 2B:
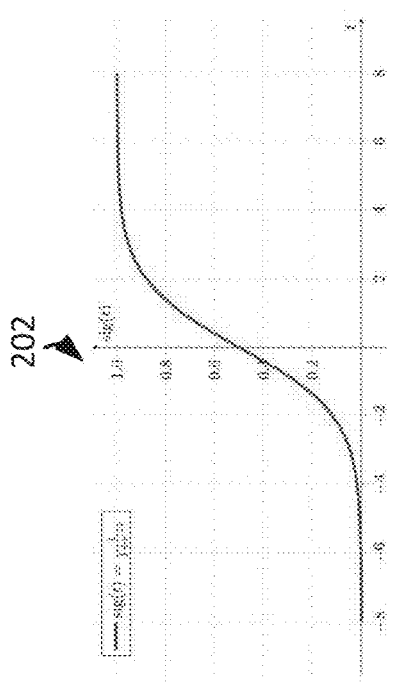
Figure 2A:
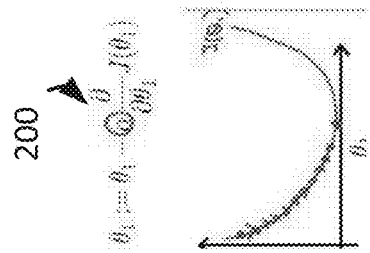

FIG. 2A depicts a graph 200 that illustrates an example gradient descent-based loss function, using the equation, J=(Expected–Actual)$^2$=$\Sigma[\theta_1 x_i - y_i]^2$. The gradient descent method can yield negative weights. If there are multiple minima, the loss function can get stuck in local minima. For more than one parameter, the loss function is multi-dimensional. A random restart occurs when different initial estimates of parameters lead to different minima.

FIG. 2B and FIG. 2C depict graphs 202 and 204, respectively, which illustrate example loss functions for the previously described equation, record match score (S, C)=A*field_match_score_weight(S, C)+(1−A)* normalized_intrinsic_score_weight(S, C), where A is the importance given to the field match score relative to the intrinsic score. The loss function inputs a set of triples scores (R1, R2). The fidelity loss is depicted by the graph 202 and defined as:

$L$=1−sqrt(1−sigmoid($R2-R1$)), and the cross-entropy loss is depicted by the graph 204 and defined as:

$L$=log(1+$e(R2-R1)$).

For example, the adaptive ranking machine-learning model applies the fidelity loss function L=1−sqrt(1−sigmoid (R2-R1)) over multiple iterations to the example field weights and field match scores depicted above for Record 1 and Record 2. For each iteration, (R2−R1) equals the iteration's field weights multiplied by the differences between the corresponding field match scores:

R2−R1=[0.4*(60−80),0.6*(100−90),0.2*(90−90)]=
    [0.4*−20,0.6*10,0.2*0]=[−8,6,0],  Iteration 1:

Fidelity Loss=1−sqrt(1−sigmoid([−8,6,0])=1−sqrt(1−
    1/(1+e$^{-(-8+6+0)}$)=(1−sqrt(1−1/(1+e$^2$)=0.06149

For the next iteration, the adaptive ranking machine-learning model changes the organization name weight from 0.4 to 0.5 (but could have changed this weight from 0.4 to 0.3)

R2−R1=[0.5*(60−80),0.6*(100−90),0.2*(90−90)]=
    [0.5*−20,0.6*10,0.2*0]=[−10,6,0],  Iteration 2:

Fidelity Loss=1−sqrt(1−sigmoid([−10,6,0])=1−sqrt
    (1−1/(1+e$^{-(-10+6+0)}$)=(1−sqrt(1−1/(1/
    (1+e$^4$)=0.00903

Since the adaptive ranking machine-learning model calculated a smaller (more optimal) fidelity loss in iteration 2 relative to the calculated fidelity loss in iteration 1, the adaptive ranking machine-learning model's next iteration continues changing the organization name weight in the same direction, such as from 0.5 to 0.6. If the calculated fidelity loss from using the organization name weight of 0.6 is greater (less optimal) than the calculated fidelity loss from using the organization name weight of 0.5, then the adaptive ranking machine-learning model's next iteration changes the organization name weight in the opposite direction, such as from 0.6 to 0.55. The adaptive ranking machine-learning model continues iterating by changing the organization name weight in the appropriate directions until a minimal value is identified for the loss function, which corresponds to the optimal value for the final organization name weight. Rather than applying the fidelity loss function to only 1 field weight for only 2 records that are compared to an input record, the adaptive ranking machine-learning model applies the fidelity loss function to every field weight for a large set of records that are compared to an input record.

The adaptive ranking machine-learning model can adjust the weights, such as by using a stochastic gradient descent or the limited memory Broyden-Fletcher-Goldfarb-Shanno algorithm, from the human feedback. A stochastic gradient descent is an iterative method for optimizing an objective function with suitable smoothness properties by replacing the actual gradient (calculated from the entire data set) by an estimate thereof (calculated from a randomly selected subset of the data). The Broyden-Fletcher-Goldfarb-Shanno algorithm is an iterative method for solving unconstrained non-linear optimization problems. The optimization is constrained because the weights need to be positive, and second order derivatives are used to reach the minima.

Figure 2D:
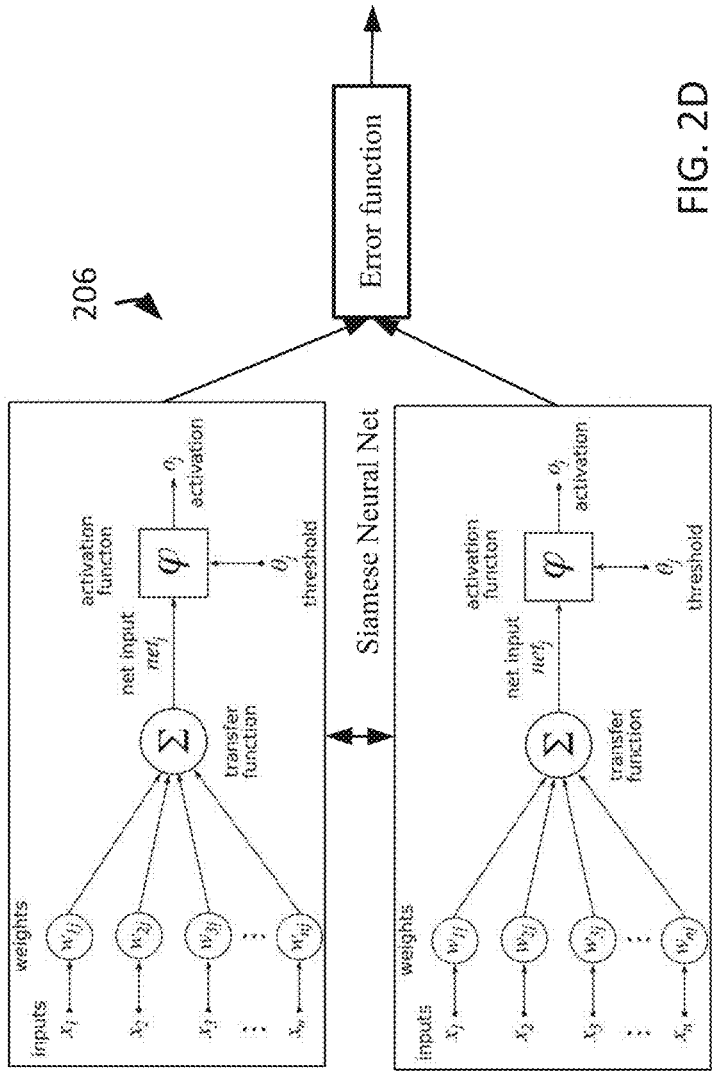

FIG. 2D depicts an overview of an example classifier 206 for the adaptive ranking machine-learning model. The classifier learns through back propagation, such as by using the gradient descent method, and applies a cross-entropy loss. The classifier 206 is based on the following equations:

$P_{pc}(f)=[\exp(f(x_p)-f(x_c))]/[1+\exp(f(x_p)-f(x_c))]$ $L(f,x_p,x_c,y_{pc})=-P_{pc} \log P_{pc}(f)-(1-P_{pc})\log(1-P_{pc}(f))$ For the following examples, the database system maintains a database, acquires a dataset that stores "ed jones salesforce corporation 415-901-7000" in a prospective record's fields, and executes a shallow matching engine that identifies multiple candidate records for matching the prospective record. After training the machine-learning models, first elements are identified in a field of a prospective record for a database, and second elements are identified in in field of the database's candidate record for matching the prospective record, block 106. The system prepares to match record fields' values by identifying components of values from the same field of prospective and candidate records. In embodiments, this can include the database system identifying "ed", "jones", "salesforce corporation", and "415-901-7000" in the first name, last name, organization name, and phone number fields of the prospective record, and identifies "Dr. Edward", "Jones", and "Salesforce.com, Inc." in the first, last, and organization name fields of one of the candidate records.

Following the identification of the fields' elements, features are identified for any of the first elements that are identical to any of the second elements, any of the first elements that are absent from the second elements, and any of the second elements that are absent from the first elements, block 108. The system prepares to match record fields' values by identifying features of the record fields' values. For example, and without limitation, this can include the database system identifying features that include two consecutive characters "ed" in both the prospective record's first name field and the candidate record's first name field, an unmatched prefix "Dr." in the candidate record's first name field, and an unmatched suffix "ward" in the candidate record's first name field.

Having identified the record fields' features, a machine-learning model uses the features to determines a field match score for a candidate record's field, block 110. A machine-learning model scores the match of a candidate record field's value to a prospective record field's value. By way of example and without limitation, this can include the database system model using the first name field features to calculate a first name field match score of 90 for the candidate record's first name field value, and other features to calculate a last name field match score of 95 for the candidate record's last name field value, and an organization name field match score of 85 for the candidate record's organization name field value.

After calculating a field match score for a candidate record's field value, another machine-learning model uses weighing of a field match score and weighing of another field match score for another field of a candidate record to determine a record match score for a candidate record, block 112. A machine-learning model calculates a record match score for a candidate record. In embodiments, this can include the database system multiplying the first name field match score of 90 by the first name field weight of 0.5, multiplying the last name field match score of 95 by the last name field weight of 0.6, and multiplying the organization name field match score of 85 by the organization name field weight of 0.8, and aggregating the three products of 45.0, 57.0, and 68.0 to calculate a record match score of 170.0 for the candidate record.

Following the calculation of a record match score for a candidate record, a determination is made whether the record match score satisfies a threshold, block 114. The system determines if a candidate record's score indicate a match with a prospective record. For example, and without limitation, this can include the database system determining whether the record match score of 170.0 is greater than the first-last-organization-name threshold of 150.0. A threshold can be the numerical magnitude that must be met or exceeded for a certain reaction, phenomenon, result, or condition to occur or be manifested. After the machine-learning models calculate field match scores for the values stored in a candidate record's combination of fields, and use the field match scores to calculate a record match score for the candidate record, the database system can compare the record match score against a threshold that is based on the same combination of fields. For example, if the machine-learning model calculates field match scores for the values in a candidate record's organization name and address fields, the database system compares the resulting record match score to a threshold that is based on the organization name and address fields.

Although this example describes comparing the record match score for a candidate record against a predetermined threshold value, the threshold may have a dynamic value that is determined by comparing the candidate record's record match score against the record match scores for the other candidate records. After such a comparison, the database system creates a ranked list of candidate records with the highest record match scores as matches for the prospective record. For example, the database system acquires a dataset that includes hundreds of prospective records, selects one of the prospective records, and executes the shallow matching engine to identify existing database records that are candidates for matching the selected prospective record, which results in identifying 95 candidate records for the prospective record. The database system executes the machine learning models to create field match scores and record match scores for the 95 candidate records, and then creates a ranked list of the 5 candidate records with the 5 highest record match scores as a list of records that match the prospective record.

Alternatively, the threshold can be a hybrid of the predetermined value threshold and the dynamic threshold value based on comparisons with other candidate records' record match scores. For example, if only 5 candidate records have record match scores that are greater than a threshold that is 80% of the possible maximum record match score, the database system creates a ranked list of the 5 candidate records with the highest record match scores. However, if 57 candidate records have record match scores that are greater than a threshold that is 80% of the possible maximum record match score, the database system creates a ranked list of the 9 candidate records with the highest record match scores that are greater than a threshold that is 90% of the possible maximum record match score.

If a record match score satisfies a threshold, the method 100 continues to block 116 to match the candidate and prospective records. If a record match score does not satisfy a threshold, the method 100 returns to block 106 to evaluate the matching of any remaining candidate records that remain to be evaluated or terminates if no candidate records remain to be evaluated.

If a record match score satisfies a threshold, a candidate record is identified as matching a prospective record, block 116. The system matches the prospective record with a candidate record that has a sufficiently high record match score. By way of example and without limitation, this can include the database system identifying the candidate record as matching the prospective record, because the record match score of 170.0 is greater than the first-last-organization-name threshold of 150.0, and updating the database system's existing profile record for Salesforce's Dr. Edward Jones with the prospective record's phone number for ed jones, which the database system previously lacked.

The method 100 may be repeated as desired. Although this disclosure describes the blocks 102-116 executing in a particular order, the blocks 102-116 may be executed in a different order. In other implementations, each of the blocks 102-116 may also be executed in combination with other blocks and/or some blocks may be divided into a different set of blocks.

System Overview

Figure 3:
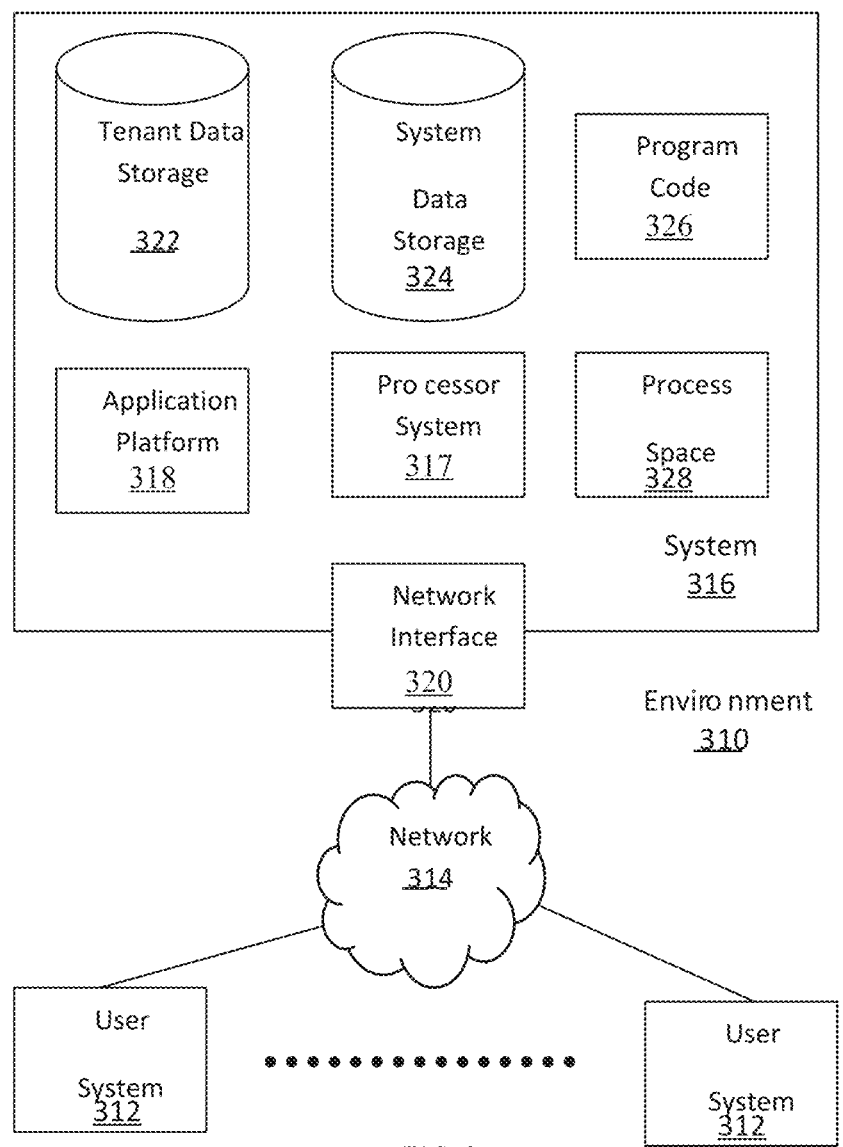
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a workstation, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 4:
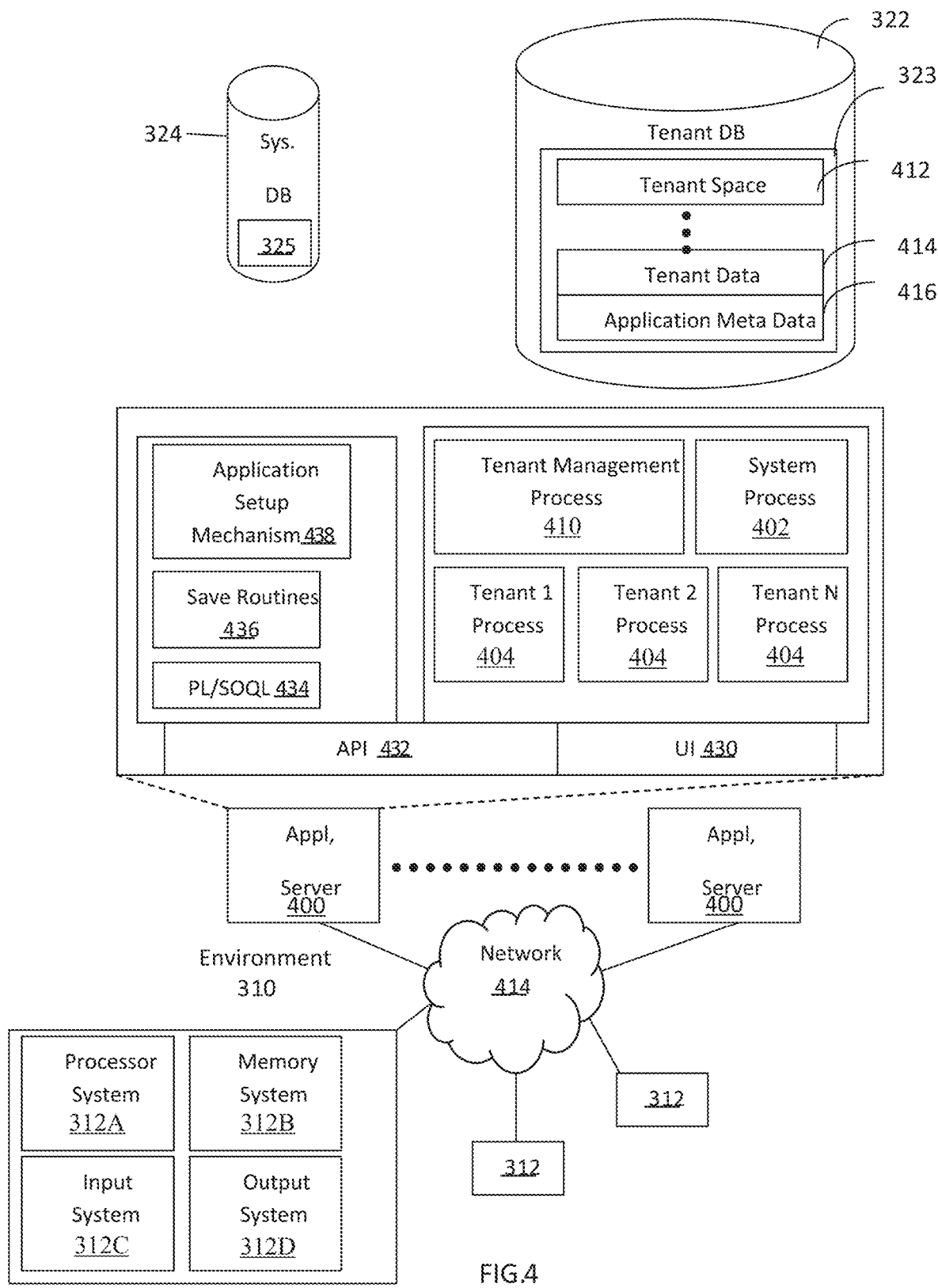
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers $400_1$-$400_N$, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which may be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also may be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for adaptive field-level matching, the system comprising:
one or more processors; and
a non-transitory computer readable medium storing a plurality of instructions, which when executed, cause the one or more processors to:
identify first elements in a field of a prospective record for a database, and second elements in the field of a candidate record, in the database, for matching the prospective record;
identify features corresponding to any of the first elements that are identical to any of the second elements, any of the first elements that are absent from the second elements, and any of the second elements that are absent from the first elements;
determine, by a machine-learning model, a field match score, based on the features, for the second elements in the field of the candidate record;
determine, by another machine-learning model, a record match score, based on weighing the field match score and weighing another field match score for another field of the candidate record, for the candidate record;
determine whether the record match score satisfies a threshold; and
identify the candidate record as matching the prospective record, in response to a determination that the record match score satisfies the threshold.

2. The system of claim 1, wherein the plurality of instructions further causes the processor to train the machine-learning model to determine field match scores, based on features associated with elements in fields of prospective records and elements in the fields of candidate records, for the elements in the fields of the candidate records.

3. The system of claim 1, wherein the plurality of instructions further causes the processor to train the other machine-learning model to generate weights for field match scores, and determine record match scores, based on using the weights for weighing the field match scores, for candidate records.

4. The system of claim 1, wherein the field comprises a postal code field, the first elements and the second elements comprise first characters and second characters, and the features comprise at least one of consecutive characters of the first characters which correspond to and are identical to consecutive characters of the second characters, a suffix comprising at least one of the first characters that lacks correspondence to any of the second characters, a prefix comprising at least one of the first characters that corresponds to and differs from at least one of the second characters, and a suffix comprising at least one of the first characters that corresponds to and differs from at least one of the second characters.

5. The system of claim 1, wherein the field comprises a phone number field, the first elements and the second elements comprise first characters and second characters, and the features comprise at least one of consecutive characters of the first characters which correspond to and are identical to consecutive characters of the second characters, a prefix comprising at least one of the first characters that lacks correspondence to any of the second characters, a prefix comprising at least one of the first characters that corresponds to and differs from at least one of the second characters, and a suffix comprising at least one of the first characters that corresponds to and differs from at least one of the second characters.

6. The system of claim 1, wherein the field comprises a personal first name field, the first elements and the second elements comprise first characters and second characters, and the features comprise at least one of consecutive characters of the first characters which correspond to and are identical to consecutive characters of the second characters, a prefix comprising at least one of the first characters that corresponds to and differs from at least one of the second characters, a prefix comprising at least one of the first characters that lacks correspondence to any of the second characters, a suffix comprising at least one of the first characters that corresponds and differs from at least one of the second characters, and a suffix comprising at least one of the first characters that lacks correspondence to any of the second characters.

7. The system of claim 1, wherein the field comprises an organization name field, the first elements and the second elements comprise first words and second words, and the features comprise at least one of matched words, which comprise each of the first words that are identical to any of the second words, and a probability that each of the matched words is in a list of organization names, and unmatched words, which comprise each of the first words that are absent from the second words and each of the second words that are absent from the first words, and a probability that each of the unmatched words is in the list of organization names.

8. A computer program product comprising computer-readable program code to be executed by one or more processors when retrieved from a non-transitory computer-readable medium, the program code including instructions to:
identify first elements in a field of a prospective record for a database, and second elements in the field of a candidate record, in the database, for matching the prospective record;
identify features corresponding to any of the first elements that are identical to any of the second elements, any of the first elements that are absent from the second elements, and any of the second elements that are absent from the first elements;
determine, by a machine-learning model, a field match score, based on the features, for the second elements in the field of the candidate record;
determine, by another machine-learning model, a record match score, based on weighing the field match score and weighing another field match score for another field of the candidate record, for the candidate record;
determine whether the record match score satisfies a threshold; and
identify the candidate record as matching the prospective record, in response to a determination that the record match score satisfies the threshold.

9. The computer program product of claim 8, wherein the program code includes further instructions to train the machine-learning model to determine field match scores, based on features associated with elements in fields of prospective records and elements in the fields of candidate records, for the elements in the fields of the candidate records.

10. The computer program product of claim 8, wherein the program code includes further instructions to train the other machine-learning model to generate weights for field match scores, and determine record match scores, based on using the weights for weighing the field match scores, for candidate records.

11. The computer program product of claim 8, wherein the field comprises a postal code field, the first elements and the second elements comprise first characters and second characters, and the features comprise at least one of consecutive characters of the first characters which correspond to and are identical to consecutive characters of the second characters, a suffix comprising at least one of the first characters that lacks correspondence to any of the second characters, a prefix comprising at least one of the first characters that corresponds to and differs from at least one of the second characters, and a suffix comprising at least one of the first characters that corresponds to and differs from at least one of the second characters.

12. The computer program product of claim 8, wherein the field comprises a phone number field, the first elements and the second elements comprise first characters and second characters, and the features comprise at least one of consecutive characters of the first characters which correspond to and are identical to consecutive characters of the second characters, a prefix comprising at least one of the first characters that lacks correspondence to any of the second characters, a prefix comprising at least one of the first characters that corresponds to and differs from at least one of the second characters, and a suffix comprising at least one of the first characters that corresponds to and differs from at least one of the second characters.

13. The computer program product of claim 8, wherein the field comprises a personal first name field, the first elements and the second elements comprise first characters and second characters, and the features comprise at least one of consecutive characters of the first characters which correspond to and are identical to consecutive characters of the second characters, a prefix comprising at least one of the first characters that corresponds to and differs from at least one of the second characters, a prefix comprising at least one of the first characters that lacks correspondence to any of the second characters, a suffix comprising at least one of the first characters that corresponds and differs from at least one of the second characters, and a suffix comprising at least one of the first characters that lacks correspondence to any of the second characters.

14. The computer program product of claim 8, wherein the field comprises an organization name field, the first elements and the second elements comprise first words and second words, and the features comprise at least one of matched words, which comprise each of the first words that are identical to any of the second words, and a probability that each of the matched words is in a list of organization names, and unmatched words, which comprise each of the first words that are absent from the second words and each of the second words that are absent from the first words, and a probability that each of the unmatched words is in the list of organization names.

15. A computer-implemented method for adaptive field-level matching, the computer-implemented method comprising:
    identifying first elements in a field of a prospective record for a database, and second elements in the field of a candidate record, in the database, for matching the prospective record;
    identifying features corresponding to any of the first elements that are identical to any of the second elements, any of the first elements that are absent from the second elements, and any of the second elements that are absent from the first elements;
    determining, by a machine-learning model, a field match score, based on the features, for the second elements in the field of the candidate record;
    determining, by another machine-learning model, a record match score, based on weighing the field match score and weighing another field match score for another field of the candidate record, for the candidate record;
    determining whether the record match score satisfies a threshold; and
    identifying the candidate record as matching the prospective record, in response to a determination that the record match score satisfies the threshold.

16. The computer-implemented method of claim 15, wherein the computer-implemented method further comprises:
    training the machine-learning model to determine field match scores, based on features associated with elements in fields of prospective records and elements in the fields of candidate records, for the elements in the fields of the candidate records; and
    training the other machine-learning model to generate weights for the field match scores, and determine record match scores, based on using the weights for weighing the field match scores, for candidate records.

17. The computer-implemented method of claim 15, wherein the field comprises a postal code field, the first elements and the second elements comprise first characters and second characters, and the features comprise at least one of consecutive characters of the first characters which correspond to and are identical to consecutive characters of the second characters, a suffix comprising at least one of the first characters that lacks correspondence to any of the second characters, a prefix comprising at least one of the first characters that corresponds to and differs from at least one of the second characters, and a suffix comprising at least one of the first characters that corresponds to and differs from at least one of the second characters.

18. The computer-implemented method of claim 15, wherein the field comprises a phone number field, the first elements and the second elements comprise first characters and second characters, and the features comprise at least one of consecutive characters of the first characters which correspond to and are identical to consecutive characters of the second characters, a prefix comprising at least one of the first characters that lacks correspondence to any of the second characters, a prefix comprising at least one of the first characters that corresponds to and differs from at least one of the second characters, and a suffix comprising at least one of the first characters that corresponds to and differs from at least one of the second characters.

19. The computer-implemented method of claim 15, wherein the field comprises a personal first name field, the first elements and the second elements comprise first characters and second characters, and the features comprise at least one of consecutive characters of the first characters which correspond to and are identical to consecutive characters of the second characters, a prefix comprising at least one of the first characters that corresponds to and differs from at least one of the second characters, a prefix comprising at least one of the first characters that lacks correspondence to any of the second characters, a suffix comprising at least one of the first characters that corresponds and differs from at least one of the second characters, and a suffix comprising at least one of the first characters that lacks correspondence to any of the second characters.

20. The computer-implemented method of claim 15, wherein the field comprises an organization name field, the first elements and the second elements comprise first words and second words, and the features comprise at least one of matched words, which comprise each of the first words that are identical to any of the second words, and a probability that each of the matched words is in a list of organization names, and unmatched words, which comprise each of the first words that are absent from the second words and each of the second words that are absent from the first words, and a probability that each of the unmatched words is in the list of organization names.

* * * * *